Feb. 2, 1965    N. PORATH    3,168,728
BISTABLE INDICATING DEVICE
Filed Aug. 11, 1960

*INVENTOR.*
NACHUM PORATH

*AGENT*

United States Patent Office 3,168,728
Patented Feb. 2, 1965

3,168,728
BISTABLE INDICATING DEVICE
Nachum Porath, Tel-Aviv, Israel, assignor to Sperry Rand Corporation, New York, N.Y., a corporation of Delaware
Filed Aug. 11, 1960, Ser. No. 48,977
6 Claims. (Cl. 340—252)

This invention relates to a transistor circuit, and more particularly to a transistor circuit which has two stable states of operation. In addition, the transistor circuit can be simultaneously used as an indicator for showing in which of the stable states the transistor resides at any particular time.

In computing machines, for example especially those of the digital variety, there are many uses for logic circuits, thyratron circuits, and indicator circuits. Therefore, there are many applications of a circuit of the type described because this circuit includes each of those properties.

Thus, in a business machine, many of which are known in the art, the information to be utilized is normally stored or utilized in the form of electrical impulses. These electrical impulses are, of course, only discernible by means of collateral devices, for example glow tubes. That is, for example, a panel or control board may be constructed such that a plurality of glow tubes are arrayed thereon in a predetermined pattern. By visually noting the appearance of a glow at a particular location on the board (or similarly the lack of a glow), the information in the machine may be readily interpreted by the machine operator. Similarly, by means of a plurality of selectively operated relays for example in the circuitry, the information may be made readily discernible to the operator in other ways. For example, the operations of relays may enable other circuits which operate subsidiary devices, for example an electric typewriter, thereby transmitting the appropriate information to the machine operator.

Therefore, one object of the invention is to provide a transistor circuit to provide thyratron-like latching action.

A further object of the invention is to provide a transistor circuit having two stable states such that the circuit performs a logical function.

Another object of the invention is to provide a fail-safe indicator circuit for indicating the state of the circuit.

Yet another object of the invention is to provide an indicator circuit which is independent of rise time and differentiation of input signals to trigger the indicating device.

Still another object of the invention is to provide a transistorized indicator circuit having the above-listed properties and which is independent of possible beta characteristic changes in the transistor within a very wide range.

Thus, in accordance with this invention, there is provided a transistor which resides in one stable state or another in accordance with the input signal applied to the circuit. Coupled to the transistor is a neon glow tube which is OFF when the transistor is non-conducting and which is turned ON to glow when the transistor is conducting thereby positively indicating the state of the transistor. This positive indication is, moreover, continued until the state of the circuit is actively changed. Furthermore, a change in the state of the indicator tube will produce a change in the state of the circuit provided the input signal has terminated. In addition, by sampling the potential at one of the transistor electrodes for example by including a load means in the form of a relay, which may be operated or not in accordance with the current passing through the energizing coil of the relay, a logic element having two stable states may be effected. Similarly, since this circuit is switched, for example to the ON state by an input pulse and then remains in the ON state even after the subsidence of the input pulse and until positively reset, thyratron action is also obtainable.

Other objects and advantages of the circuit of this invention will be appreciated by reference to the following detailed description of the apparatus along with the attached drawings in which.

Figure 1:
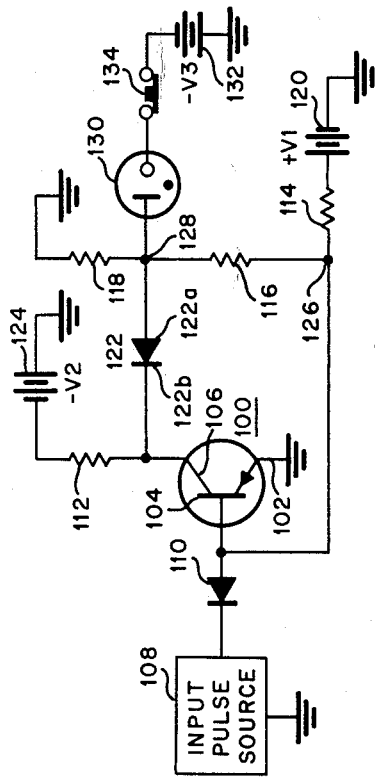
FIGURE 1 is a schematic diagram of one embodiment of the circuit of the present invention.

Referring to FIGURE 1, there is shown a transistor 100 which may be of the pnp junction type for example. The transistor has its emitter electrode 102 grounded whereby the emitter potential is ground. The base electrode 104 of the transistor is coupled to input pulse source 108 via the buffer diode 110. There is shown only one diode 110 and one source 108; however, it is to be understood that a plurality of these components may be similarly connected to effect OR gate operation. The input source 108 may actually be an output stage of another circuit in a computer for example, and is used to supply information in the form of pulses whereby the indicating network may be activated. Thus, input source 108 may comprise a grounded emitter transistor amplifier (not shown) which has its collector connected to a negative voltage source via a load resistor. The cathode of diode 110 is then connected to the collector of the transistor. This type of input source may provide the input signals for the instant circuit. These input signals will be negative going inasmuch as the potential at the collector of the transistor amplifier varies between ground potential and the negative potential determined by the aforesaid negative voltage source. The potential of the negative voltage source should be sufficiently large to trigger transistor 100 in view of its forward impedance drop and the forward impedance drop of diode 110. An exemplary magnitude for the input signal is $-0.5$ volt. A voltage divider network comprising resistor 112, resistor 114, resistor 116 and resistor 118 is connected to the transistor. This voltage divider network is specifically connected so that resistor 114 is connected between base 104 and a potential source 120 which provides a positive potential $+V_1$; resistor 112 is connected between transistor collector 106 and a potential source 124 which provides a negative potential $-V_2$; and resistors 116 and 118 are connected in series between ground and transistor base 104. In addition, a diode 122 is connected between the transistor collector 106 and series junction 128 of resistors 116 and 118 so that current flow is from the series junction to the collector. A voltage regulator tube 130 which may be a type NE–2 neon glow tube, for example, is connected between the series junction 128 and a potential source 132 which provides a negative potential $-V_3$. It may be seen that by properly choosing the values of potentials $+V_1$, $-V_2$, and $-V_3$ and the voltage divider resistors 112, 114, 116 and 118, a near ground potential is provided at the base 104 of transistor 100 in the quiescent OFF condition of the transistor. As illustrative values, $V_1$ may be $+45$ volts, $V_2$ may be $-11$ volts, and $V_3$ may be $-75$ volts for example; and resistors 112, 114, 116 and 118 may be 2,000 ohms; 88,000 ohms; 20,000 ohms; and 200,000 ohms respectively. Thus, in the absence of an input signal at input terminal 108, transistor 100 is cut off because the base of the transistor 100 is maintained at a potential $e_1$, which is a fraction of a volt positive with respect to ground (see FIGURE 2). For example, $e_1$ may be about +0.1 volt, in order to prevent the transistor from being inadvertently turned ON. (Similarly, this small voltage must be sufficiently small that diode 110 is not enabled.) The potential at terminal 128 (and likewise at the anode 122a of diode 122) is maintained at approximately −10 volts by the voltage divider network (i.e. potential sources and resistors).

However, the potential of −10 volts at terminal 128 is primarily regulated and determined by a voltage regulator tube 130. That is, a predetermined voltage is maintained across the tube 130 during its normal pre-ignition operation. For example, the glow tube may be expected to have a voltage drop of about 65 volts across its terminals when it is not turned on. The potential value $-V_3$ is defined by the voltage drop necessary across tube 130, e.g. 75 volts, such that the glow tube may be fired when the transistor is switched to its ON state as explained subsequently. Thus, according to the description, the circuit is normally found to reside in the OFF state, with transistor 100 and glow tube 130 each cut off and a small constant current flowing in load resistor 112. The transistor is cut off because of the back bias between its base and emitter; the glow tube is cut off because the potential across its terminals is below the necessary ignition level of 75 volts; and the constant current through resistor 112 flows from terminal 128 to source 124. The magnitude of the constant current is determined by load resistor 112 and the potential difference thereacross which in the illustrative case will be approximately one volt.

Figure 2:
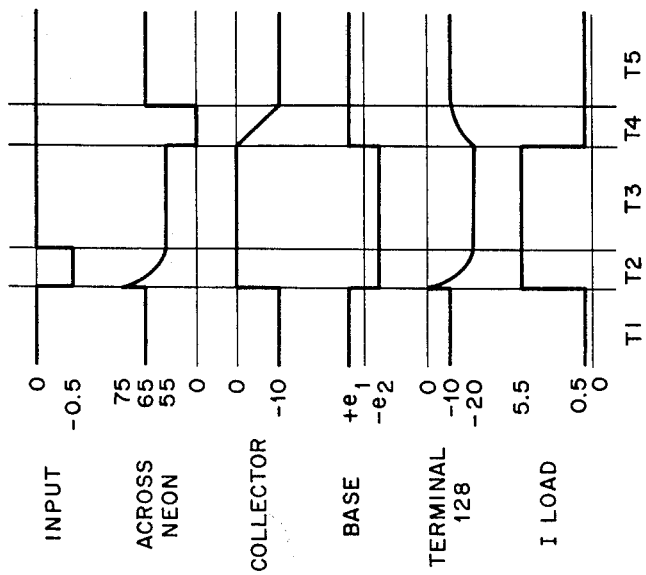
FIGURE 2 is a timing diagram showing the relative potential levels throughout the circuit at specified times.

Referring now to FIGURE 2, the potentials at various points in the circuit while in the OFF condition are shown during the time period $T_1$. Consequently, it is shown that during time period $T_1$ the potential at series junction 128 is approximately −10 volts. In this OFF condition the voltage across the glow tube 130 is approximately 65 volts which is safely below the ignition potential of approximately 70–75 volts. Furthermore, this potential level at junction 128 effectively maintains the collector 106 at −10 volts.

In view of the component values suggested, the base potential is positive by a fraction of a volt and since the emitter is at a potential value of ground, the transistor is clearly biased OFF. Since the transistor is biased OFF, the collector voltage remains at about −10 volts so that the current through resistor 112 (represented by I load in FIGURE 2) is approximately 0.5 milliampere and the potential difference across the resistor is about one volt. The current flowing through resistor 112 is a combination of currents supplied by source 120 via resistors 114 and 116; and from ground via resistor 118. The OFF condition will prevail so long as there is no negative input signal applied by source 108.

If now, as shown during the period $T_2$, a negative going input pulse is supplied by input source 108, diode 110 is enabled and the potential at base 104 of the transistor 100 goes negative to the potential $-e_2$ which may be for example −0.1 volt, whereupon the transistor 100 switches to the conductive or ON state.

Upon the switching of the transistor by a negative going input signal, current flows from the emitter 102 through the transistor 100, to the collector 106 whereby the collector 106 approaches the ground potential of the emitter 102. When the current flows through the transistor, thereby driving the collector 106 to ground, the diode 122 is cut off since a more positive potential appears at its cathode 122b than at its anode 122a. Thus, the voltage divider path including resistor 112 and source 124 is effectively removed from the overall voltage divider network. Since the diode 122 is back-biased, the potential at terminal 128 temporarily rises to near ground potential.

Specifically, terminal 128 may achieve the ground potential value for only an instant. However, substantially the full potential $-V_3$ is, at that time, dropped across glow tube 130 so that the tube ignites thereby emitting a glow which indicates the state or condition of the circuit. For example, the firing of the glow tube may indicate the conducting condition of the circuit, that is, that the transistor is turned ON. However, that the firing of the glow tube may be indicative of the non-conducting or OFF condition of the circuit is contemplated and this latter type of operation may be effected by proper modifications of the various potential values and other component modifications as will be readily apparent to those skilled in the art.

As may be seen, during time $T_2$ after tube 130 ignites, the potential drop across the tube 130 decays from the ignition or firing potential which is approximately 70–75 volts, to the normal sustaining voltage level (approximately 55 volts) whereby the potential at terminal 128 drops to about −20 volts, thereby assuring that the diode 122 remains cut off. Moreover, the potential at junction 126 has changed only slightly (less than 0.5 volt). Therefore, the current through resistor 116 in the ON condition must almost double with respect to the current through resistor 116 in the OFF condition. The extra current is supplied by base current from transistor 100.

The current drawn by glow tube 130 together with the potential at terminal 128 ensures that base-emitter current continues because of the application of a negative potential at base 104, whereby the transistor is maintained in its ON or conductive condition.

As shown in FIGURE 2, the negative base potential provided in the operative state may be a fraction of a volt; this should be understood as being merely illustrative, and it is to be noted that the application of virtually any negative potential at the transistor base will maintain the transistor in its ON condition. It may be seen, therefore, that once the circuit has been switched to the ON state it remains in this state (until positively changed) because a negative potential is sustained at base 104 of transistor 100; that is, the circuit values are chosen in accordance with the neon tube current value to ensure continued base current. This operation, thus, provides a positive, fail-safe, indicating circuit.

Until the circuit is reset or switched back to its OFF state, the potential at the base 104 of the transistor 100 has remained at the potential $-e_2$ (approximately −0.1 volt) so that the transistor continues to conduct. The current and the potential at the base of the transistor are determined by the components of the voltage divider and the glow tube; and both current and potential remain substantially constant during the ON condition of the circuit which is represented by the time periods $T_2$ and $T_3$. A typical base current value for this circuit is about 0.5 milliampere.

In order to reset the circuit to its non-conducting or OFF state, a reset switch 134 is operated during time period $T_4$ to positively change the condition of the circuit. As illustrated, the switch 134 may be a manually operated mechanical switch. However, it is contemplated that this switch may be electronic or electrically operated. When the switch 134 is operated, during time period $T_4$ in FIGURE 2, the glow tube circuit is broken, the voltage across the tube 130 drops to zero, and current conduction through the tube is interrupted. Therefore, the potential at terminal 128 rises toward ground, as shown, because the effect of the negative potential $(-V_3)$ of source 132 is eliminated. This potential is reflected to the base 104 of the transistor 100 via resistor 116 so that the base is driven to the positive potential $e_1$. With the application of the positive potential, the transistor 100 becomes effectively back-biased between its emitter and base electrodes and is cut off whereby the diode 122 becomes forward biased. Since the transistor is cut off by the back-bias, and the voltage divider network comprising sources 124, 120, diode 122 and resistors 112 through 118 is restored, the potential on collector 106 tends to fall toward its original cut off value of approximately −10 volts. This potential fall is a transient in the time period determined by the duration of the reset operation which breaks the glow tube circuit, and is shown diagrammatically as time period $T_4$ in FIGURE 2. As soon as the reset operation ($T_4$) is complete the switch 134 is closed, and the glow tube circuit is reconnected. The closing of switch 134 will not permit the circuit to again change to its ON condition (provided the switch has been opened for a sufficient time duration) because the voltage across glow tube 130 is again approximately 65 volts and is too low to ignite the tube.

The circuit is then in the initial OFF condition ready to receive another input pulse. That is, the base and collector potentials have returned to their original values (shown at $T_5$ in FIGURE 2), and the transistor 100 is cut off. Furthermore, since the potential drop across the glow tube 130 is now at its original value which is safely below the ignition level, the glow tube 130 is also cut off. These potential values then continue as shown in $T_5$ and/or $T_1$ until another input signal (as shown in $T_2$) appears and creates the waveshapes of $T_2$ and $T_3$, which waveshapes accompany the switching of the circuit to its conducting or ON state. Thus, the invention provides a bistable indicating circuit which persists in one of its two states until specifically switched into the other of the two states.

This circuit may actually be considered to be relatively slow since its speed is primarily dependent upon the ionization of the glow tube 130. Thus, the input signal, previously noted as having a magnitude of about −0.5 volt, should have a duration of about 0.5 millisecond to ensure that the base current from transistor 100 has reached approximately 0.5 milliampere. This current applied to the glow tube 130 for the length of the input pulse will generally be sufficient to fire the glow tube 130. Similarly, the switch 134 should be maintained open for a time period at least as long as the deionization time for the glow tube. In the illustrative example, the deionization time is about 1 millisecond.

Figure 3:
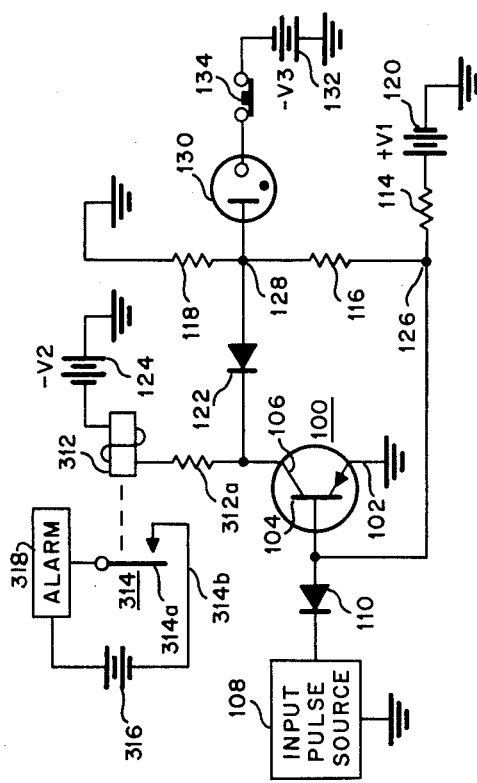
FIGURE 3 is a schematic diagram of another embodiment of the present invention with an illustrative utilization network.

Another embodiment of the invention is shown in FIGURE 3 (wherein elements similar to those shown in FIGURE 1 bear similar reference numerals). This embodiment contemplates having the circuit load composed of an energizing coil 312 of a relay 314 and an impedance 312a (for example 2,000 ohms) which may include, or even be fully comprised by, the internal resistance of the coil 312. This relay may be caused to switch from one of its states (e.g. open) to the other of its states (e.g. closed) upon the application of the input signal as shown at time $T_2$ of FIGURE 2. This operation is accomplished by the change in the potential dropped across the coil 312 when the transistor 100 switches from one condition to another. That is, in the transistor's OFF condition, the potential across coil 312 is the difference between the potential at the collector 106 (approximately −10 volts) and the potential at $-V_2$ (approximately −11 volts) thereby providing a one volt difference and a constant current of approximately 0.5 milliampere. Upon the application of the input pulse at $T_2$, the collector rises to ground potential and potential $-V_2$ remains constant at −11 volts, thereby producing an 11 volt differential across coil 312 and a current of approximately 5.5 milliamperes. This changed potential difference across the fixed resistance 312a therefore, produces current values through the coil (see I load in FIGURE 2) having approximately an 11:1 ratio when operative as compared to when non-operative. It should be noted that the above values are illustrative only and are not to be construed as limitative. For example, if a relay is used which requires a larger or smaller operating current and, therefore, a different ratio than 11:1 the resistance 312a of the coil 312 may be altered. Or alternatively, if a very high current is required, for example, the emitter 102 of transistor 100 may be connected to a positive potential source, e.g. +5 volts, and the resistors 114 and 116 changed accordingly. Thus, when the transistor is turned ON, the potential at collector 106 goes from about −10 volts to about +5 volts. Clearly, this will provide a substantially increased current.

With this circuit, the maximum collector voltage of the transistor may be effectively applied to operate the load, and to switch ON the neon tube. Moreover, the much larger voltage for operating the neon tube is provided without interference with the transistor.

It is, therefore, apparent that the increase in potential drop across and current flow through coil 312 (and resistance 312a) can be utilized to operate a relay and will permit the circuit to funtion as a bistable element. Again, when the reset switch is operated, the current through coil 312 will drop to the inoperative value and the relay will be reset to its original unactivated state. Thus, this circuit may have two operating states which may be utilized to provide a bistable circuit useful as a logic element. For example, when the relay coil 312 is energized, contact armature 314a may be drawn into contact with the terminal represented by contact point 314b. When the gap is closed between armature 314a and contact 314b, the circuit schematically represented by potential source 316 and alarm 318 is completed. This circuit (as shown) may be utilized as an additional alarm, as for example, a buzzer or the like. Thus, in addition to providing a visual indication of the state of the transistor circuit, there is also provided an aural means for determining the relative operativeness of the transistor network. This alarm network may also be useful to detect unwanted circuit conditions, for example a short circuit.

In the alternative, this circuit need not be utilized merely as an alarm but rather it is within the contemplation of this invention that the relay circuit may provide a type of logic circuit. For example, the closing of the relay contacts may signify a binary "1" and the opening of the relay contacts may signify a binary "0." Consequently, the schematically shown component 318 may comprise a vacuum tube for example or an input network to an external computer circuit whereby information from the transistor circuit may be utilized by the computer.

Moreover, the relay 314 may be utilized to control the operation of some of the peripheral equipment utilized with a computing machine. For example, a high speed typewriter, card sorter, paper tape or card puncher may be rendered operative at appropriate times chosen logically by the machine.

Furthermore, thyratron action is provided by the circuit since the circuit remains ON when switched ON until switched OFF. This positive electrical latching action may be seen to simulate thyratron action.

In addition to the foregoing objects and advantages of the invention, it may be noted that this circuit may operate as described without utilizing expensive and bulky components, for example transformers. Moreover, there is no dependence upon special signals to trigger the neon glow tube. Similarly, posssible changes in the beta characteristics of the transformer do not present any problems since the circuit is, within a ratio of over 2 to 1, independent of the transistor's beta characteristics.

This description of the invention in conjunction with the attached drawings is merely illustrative of this invention and is not meant to be limitative thereof. Other modifications and changes which may be obvious to persons having ordinary skill in the art are contemplated and are meant to be included within the scope of the invention. For example, by using a glow tube which has a greater range between its quiescent OFF potential and its ignition potential, greater reliability may be obtained.

Having thus described the invention, what is claimed is:

1. In combination, transistor means, said transistor means being normally biased in cutoff condition, glow tube means coupled to said transistor means, said glow tube being normally biased in cutoff condition, means for supplying an input signal to said transistor means in order to switch said transistor means to its conductive condition whereby a potential may be applied to said glow tube means such that said glow tube means is fired, feedback means coupled between said transistor means and said glow tube means to maintain each of said transistor means and said flow tube means in the conductive condition, and switching means for extinguishing said glow tube means so that said feedback means is altered whereby said transistor means may be restored to its cutoff condition.

2. A bistable circuit comprising a transistor having first, second and third electrodes, a neon glow tube characterized by certain ignition and extinction potentials, means for biasing said glow tube between said potentials, means for supply input signals across said first and second electrodes of said transistor to selectively operate said transistor in states of conduction and non-conduction, impedance means coupling said second electrode of said transistor to said glow tube, and variable impedance means coupling said third electrode of said transistor to said glow tube, said impedance means and said variable impedance means providing circuit paths for signals to change the tube glow potential to one of said firing and extinction potentials in response to the selection of the relative conduction state of said transistor, said impedance means coupling said glow tube to said second electrode and being operative to maintain said transistor in said relative conduction state by providing a feedback path from said glow tube to said second electrode of said transistor.

3. In an indicator circuit, a transistor having a grounded emitter, a first potential source, first impedance means coupled between a first electrode of said transistor and said first potential source, a second potential source, second impedance means coupled between a second electrode of said transistor and said second potential source, an indicator tube, a third potential source coupled to a first electrode of said indicator tube, each of said potential sources coupled to a common reference potential, diode means coupled between a second electrode of said indicator tube and said first electrode of said transistor, said diode means being operative to provide a potential of proper magnitude at said second electrode of said indicator tube such that said indicator tube is cutoff when said transistor is cutoff, third impedance means coupled between said second electrode of said indicator tube and said second electrode of said transistor, said third impedance means being operative to provide a potential of proper magnitude at said second electrode of said indicator tube such that said indicator tube is turned on when said transistor is turned on.

4. In combination, transistor means, said transistor means being normally biased in cutoff condition, glow tube means coupled to said transistor means, said glow tube means being normally biased in cutoff condition, means for supplying an input signal to said transistor means in order to switch said transistor means to its conductive condition whereby a potential may be applied to said glow tube means such that said glow tube means is fired, feedback means coupled between said transistor means and said glow tube means to provide a potential which maintains said transistor means in the conductive condition whereby said glow tube means is maintained in the ignited condition, and switching means for extinguishing said glow tube means so that the potential provided by said feedback means is altered whereby said transistor means may be restored to its cutoff condition.

5. A switching circuit comprising input signal supplying means, transistor means having first, second and third electrodes, said first transistor electrode coupled to said input signal supplying means, said second transistor electrode coupled to a first reference potential source, an indicating tube having at least first and second electrodes, said second electrode of said indicating tube connected to a second reference potential source, voltage dividing means having different terminals thereof coupled to each of said first transistor electrode and said first indicating tube electrode, at least one potential source coupled to said voltage dividing means, said potential source being adapted to supply potentials to said transistor and said indicating tube via said voltage divider which potentials are related to the respective potentials applied by said first and second reference potential sources such that said indicating tube and said transistor are cutoff in the absence of an input signal from said input supplying means and said transistor and said indicating tube are operative after the application of an input signal, and unilaterally conducting means coupled to said third transistor electrode and to said first indicating tube electrode to provide switching means therebetween, said unilaterally conducting means being conductive only when said transistor is cutoff and being nonconductive when said transistor is operative.

6. In an indicator circuit, a transistor, a first potential source, a first impedance connected between said first potential source and a first electrode of said transistor, a second potential source, a second impedance connected between said second potential source and a second electrode of said transistor, a glow tube, a third potential source coupled to a first electrode of said glow tube, a reference potential source coupled to a third electrode of said transistor, each of said potential sources having a common reference point, unidirectional conducting means coupled between a second electrode of said glow tube and said first electrode of said transistor, said unidirectional conducting means providing a current path from said glow tube to said first potential source such that said glow tube is biased to cutoff when said transistor is cutoff, and third impedance means coupled between said second electrode of said glow tube and said second electrode of said transistor, said third impedance means providing a current path from said transistor to said glow tube whereby said glow tube is turned on when said transistor is turned on, said unilateral conductor being adapted to be biased to cutoff due to the potential drop produced across said third impedance means when said transistor is turned on.

References Cited in the file of this patent

UNITED STATES PATENTS

| | | |
|---|---|---|
| 2,772,410 | Logue et al. | Nov. 27, 1956 |
| 2,831,113 | Weller | Apr. 15, 1958 |
| 2,866,106 | Schuh | Dec. 23, 1958 |
| 2,870,348 | Chao | Jan. 20, 1959 |
| 2,961,553 | Giger | Nov. 22, 1960 |
| 2,985,874 | Williams | May 23, 1961 |
| 3,034,112 | Fitch | May 8, 1962 |

OTHER REFERENCES

IBM Technical Disclosure Bulletin: vol. 2, No. 6; April 1960, pp. 87, 88.

UNITED STATES PATENT OFFICE
CERTIFICATE OF CORRECTION

Patent No. 3,168,728                      February 2, 1965

Nachum Porath

It is hereby certified that error appears in the above numbered patent requiring correction and that the said Letters Patent should read as corrected below.

Column 6, line 15, for "funtion" read -- function --; column 7, line 24, for "tube glow" read -- glow tube --.

Signed and sealed this 24th day of August 1965.

(SEAL)
Attest:

ERNEST W. SWIDER                      EDWARD J. BRENNER
Attesting Officer                        Commissioner of Patents